United States Patent

Tomita et al.

[11] Patent Number: 5,930,887
[45] Date of Patent: Aug. 3, 1999

[54] METHOD FOR MANUFACTURING IRON GOLF CLUB HEAD

[75] Inventors: Osamu Tomita; Atsushi Tsuchida, both of Hamamatsu, Japan

[73] Assignee: Yamaha Corporation, Shizuoka, Japan

[21] Appl. No.: 09/018,829

[22] Filed: Feb. 4, 1998

[30] Foreign Application Priority Data

Feb. 7, 1997 [JP] Japan .................................... 9-025056

[51] Int. Cl.⁶ ............................. B23P 17/00; A63B 53/04
[52] U.S. Cl. ......................... 29/527.1; 473/350; 473/409
[58] Field of Search ..................... 29/527.1; 409/131, 409/132; 473/291, 324, 349, 350, 409

[56] References Cited

U.S. PATENT DOCUMENTS 3,867,869 2/1975 Nyffeler et al. ........................ 409/131
5,330,187 7/1994 Schmidt et al. ........................ 473/350
5,669,824 9/1997 Alzawa et al. .......................... 473/349

*Primary Examiner*—P. W. Echols
*Attorney, Agent, or Firm*—Koda & Androlia

[57] ABSTRACT

A cavity iron golf club head being forme from a metal ingot by a rotary cutting tool that has a conical cutting section and a cylindrical cutting section which are formed into an integral unit in tow stages with the respective cutting surface angles differing from each other. An inner circumferential surface on the head sole side of an indentation formed in the back surface of the metal ingot which has been roughly finished and formed in cut into an overhanging surface shape by the conical cutting section and cylindrical cutting section of the rotary cutting tool, and the other inner circumferential surfaces on the toe and heel sides and on the top side of the metal ingot are cut into upright surface shapes by the cylindrical cutting section of the rotary cutting tool.

2 Claims, 4 Drawing Sheets

METHOD FOR MANUFACTURING IRON GOLF CLUB HEAD

BACKGROUND OF THE INVENTION

1. Field of the Invention

The present invention relates to a rotary cutting tool and a method for manufacturing an iron golf club head using the rotary cutting tool.

2. Prior Art

Most of today's iron golf club heads have a cavity that is formed on the back of the club head. The cavity is provided so as to increase the inertial moment and depth of the center of cavity by reducing the overall weight of the head, by lowering the center of gravity, and by distributing the weight to the periphery.

These iron golf club heads which are generally called cavity irons are manufactured by way of forging, lost-wax processing, etc. In addition to these methods, a cavity iron head is manufactured by, for instance, a method shown in FIG. 7. In this method, a cavity is formed by cutting an indentation 2 on the back side of a head ingot 1 which is roughly finished and formed by forging, and this cutting is performed by a rotary cutting tool 10 which is controlled by an NC machining system.

However, in the conventional method as described above, the cutting section 10a of the rotary cutting tool 10 has a cylindrical shape, and the angle θ of the cutting surface is perpendicular to the horizontal plane. Accordingly, as seen from FIG. 8, the inner circumferential surface 3a on the sole side, the inner circumferential surfaces 3b on the toe and heel sides, and the inner circumferential surface 3c on the top side of the head (these surfaces are continuous around the entire circumference of the indentation 2) can only be cut into the shape of an upright surface that has a cutting angle of α which is equal to the cutting surface angle of θ of the cutting tool.

On the other hand, a rotary cutting tool 20 which has a cutting section 20a of a conical shape may be used in the above method. The tool, as seen from FIG. 9, has an acute cutting surface angle θ with respect to the horizontal plane and can grind the inner circumferential surface 3 of the indentation 2 of the head ingot 1 into an overhanging surface shape. However, with this cutting tool 20, the inner circumferential surface 3 of the indentation 2 can only be cut into an overhanging surface shape which has a cutting angle of β, that is equal to the cutting surface angle θ of the cutting tool 20, around the entire circumference as shown in FIG. 10. Furthermore, the corner edge portions of the inner circumferential surfaces 3b on the toe and heel sides and the inner circumferential surface 3c on the top side are sharp and that causes possible danger in the handling of the club (e. g., cutting the fingers). In addition, the club made by this cutting tool 20 tends to be easily chipped due to outside impacts.

Furthermore, when the inner circumferential surface 3c on the top plate side of the indentation 2 has an overhanging surface shape, the weight of the protruding corner edge portion tends to prevent the lowering of the center of gravity of the head.

In view of these problems, it is possible to cut the head ingot 1 by selectively using two rotary cutting tools: one with a cylindrical cutting section 10a, and another with a conical cutting section 20a. However, with this method, finishing work cannot be accomplished in a single continuous process, thus requiring considerable time and effort and resulting in poor production efficiency.

Furthermore, because of the changeover between the rotary cutting tool 10 and rotary cutting tool 20, a boundary a is formed between the overhanging and upright surfaces of the indentation 2 as a step on the inner circumferential surfaces 3b on the toe and heel sides. Thus, the inner circumferential surface 3 of the indentation 2 become discontinuous; and as a result, the cavity has an unattractive appearance.

The step of such a boundary a between the overhanging and upright surfaces on the innner circumferential surface 3 of the indentation 2 can ordinarily be camouflaged by a pattern of indentations and projections. However, since the position of the step is determined by the shape of the cavity, there are limits to the position and shape of such a pattern of indentations and projections.

SUMMARY OF THE INVENTION

Accordingly, the object of the present invention is to provide a rotary cutting tool which easily grinds the cavity formed as an indentation on the back of an iron head with good efficiency and also provide a method for manufacturing an iron golf club head using this rotary cutting tool.

The object of the present invention is accomplished by a unique structure for a cutting tool for manufacturing a cavity in an iron club head, and the cutting tool has a configuration in which a conical cutting section and a cylindrical cutting section are integrally formed in a two stage fashion.

Furthermore, the object of the present invention is accomplished by a unique method for manufacturing a cavity iron head with the use of the cutting tool described above, and the method is characterized in that: the inner circumferential surface on the sole side of an indentation formed on the back side of a roughly finsished and formed club head ingot is cut into an overhanging surface shape by the conical and cylindrical cutting sections of the cutting tool, and the inner curcumferential surfaces of the indentation on the toe and heel sides and on the top plate side of the head ingot (such surfaces being continuous to the sole side circumferential surface) are cut into upright surface shapes by the cylindrical cutting section of the cutting tool, and then the entire surfaces of the club head ingot which has been subjected to the cutting is surface-treated by polishing, plating, etc.

DETAILED DESCRIPTION OF THE INVENTION

A typical embodiment of the present invention will be described below in detail with reference to FIGS. 1 through 6.

Figure 1:
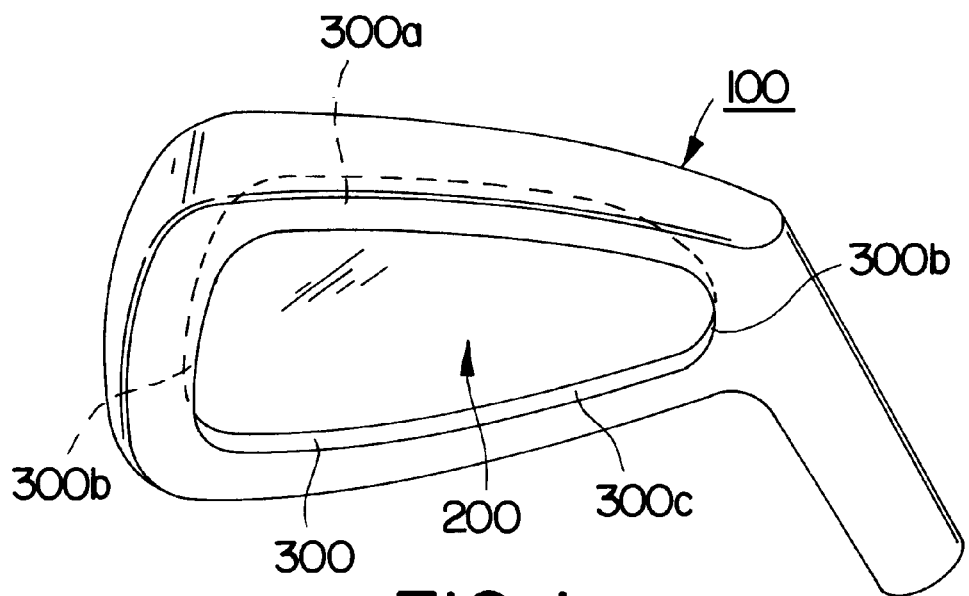
FIG. 1 is a perspective view of an iron club head manufactured by the method of one embodiment of the present invention.

As seen from FIG. 1, the reference numeral 100 denotes an iron golf club head manufactured by the rotary cutting tool of the present invention.

Figure 2:
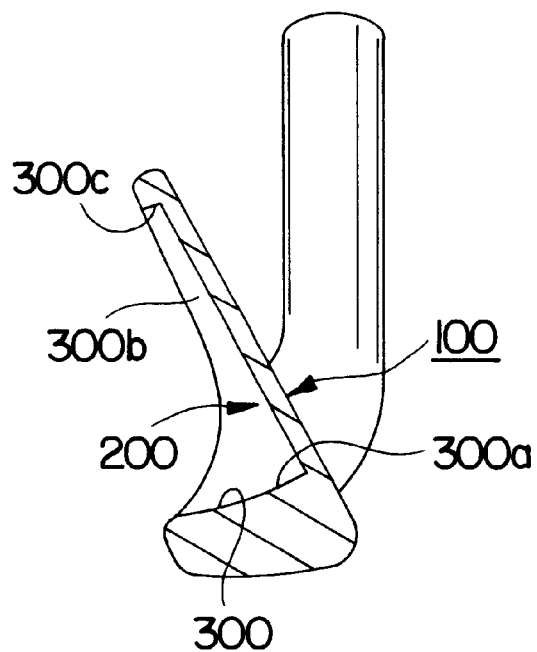
FIG. 2 is a vertical cross-section thereof.

In this golf club head 100, a cavity 200 is formed as an indentation on the back side of the head 100. As shown in FIG. 2, the inner circumferential surface 300 of this cavity 200 comprises: a sole inner circumferential surface 300a which is located on the sole side of the head, side inner circumferential surfaces 300b (only one shown) which are located on the toe and heel sides of the head, and a top inner circumferential surface 300c which is located on the top side of the head. The side and top inner circumferential surfaces 300b and 300c, which are formed with an upright surface shape, are continuous to the sole inner circumferential surface 300a which is formed with an overhanging surface shape, as described below.

Figure 3:
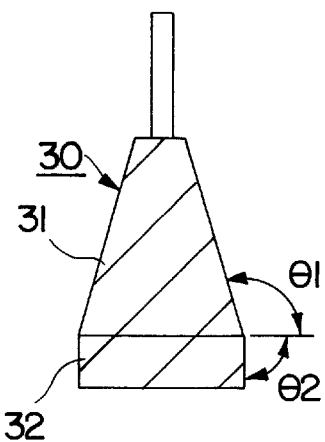
FIG. 3 illustrates the rotary cutting tool used in the method of the present invention.

FIG. 3 illustrates a rotary cutting tool 30 for manufacturing the head 100 by an NC machine system.

This rotary cutting tool 300 has a configuration in which a first cutting section 31 and a second cutting section 32 are integrally formed in two stages (above and below in FIG. 3) so that the respective cutting surface angles θ1 and θ2 differ from each other. In addition, the first cutting section 31 has a conical shape (thus called "conical cutting section 31"), and the second cutting section 32 has a cylindrical shape) thus called "cylindrical cutting section 32"); and this cylindrical cutting section 32 is, as seen from FIG. 3, integrally formed on a large diameter end of the conical cutting section 31. The cutting surface angle θ1 of conical cutting section 31 with respect to the horizontal plane is an obtuse angle on the other hand, the cutting surface angle θ2 of the cylindrical cutting section 32 with respect to the horizontal plane is substantially perpendicular.

Figure 4:
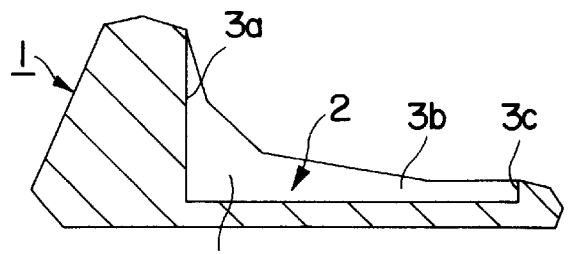
FIG. 4 shows a roughly finished and formed iron club head ingot.

When the head 100 is manufactured by the cutting tool 30, a club head ingot 1, a metal such as low-carbon steel, etc., is roughly finished and formed by forging as in the conventional method, and an indentation 2 that is to be cut is formed on the back side (on the upper side in FIG. 5) as shown in FIG. 4.

Next, the entire inner circumferential surface 3 of the indentation 2 of this head ingot 1 is cut by the rotary cutting tool 30.

Figure 5:
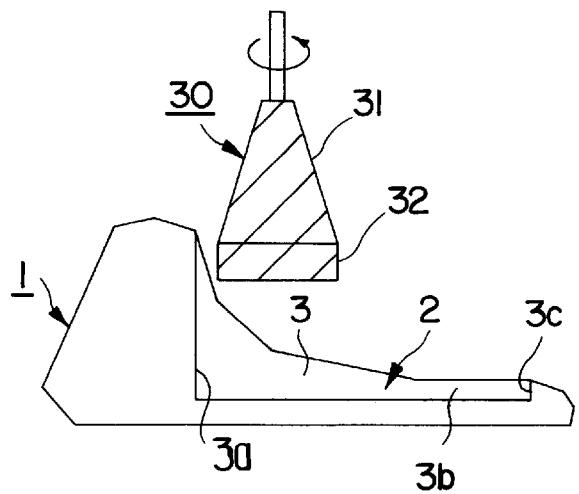
FIG. 5 illustrates the positional relationship between the cutting tool and the head ingot during the process of cavity formation.

More specifically, as shown in FIG. 5, the ingot 1 is set so that the indentation 2 faces upward; and the sole inner circumferential surface 3a on the sole side of the indentation 2 is cut into an overhanging surface shape that corresponds to the cutting surface angles θ1 and θ2 by the conical cutting section 31 and cylindrical cutting section 32 of the rotary cutting tool 30; and further, the other inner circumferential surfaces, which are the side inner circumferential surfaces (toe and heel side surfaces) 3b and the top upper circumferential surface 3c, are continuously cut by the cylindrical cutting section 32 of the cutting tool 30 into upright surface shapes that correspond to the cutting surface angle θ2 by the cylindrical cutting section 32 of the cutting tool 30.

Figure 6:
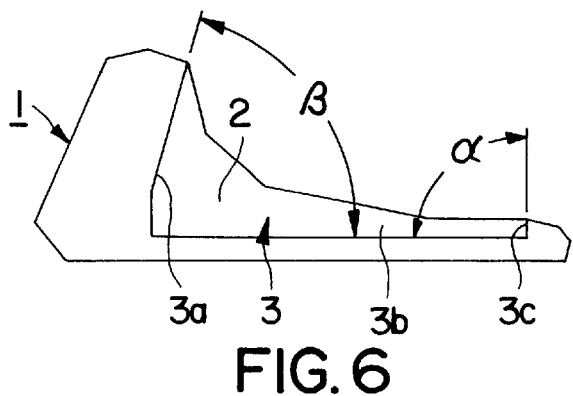
FIG. 6 illustrates the head ingot on which cutting by the rotary cutting tool has been done.
Figure 7:
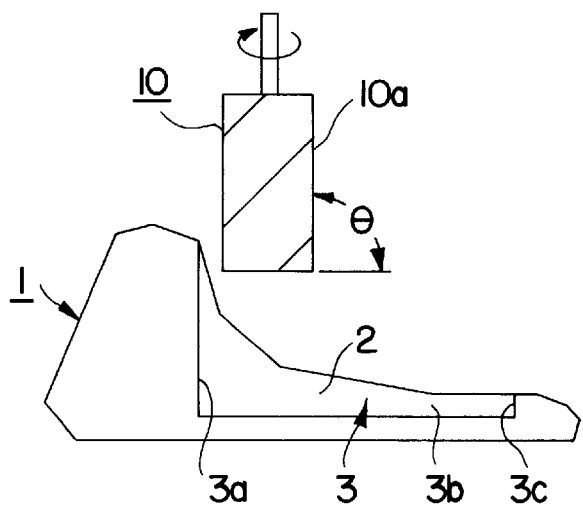
FIG. 7 illustrates a prior art cutting tool and club head ingot.
Figure 8:
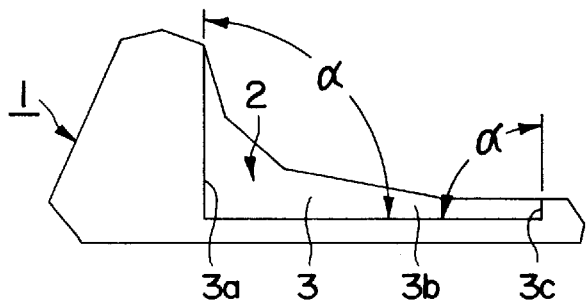
FIG. 8 shows the head ingot upon which cutting by the prior art cutting tool of FIG. 7 has been performed.
Figure 9:
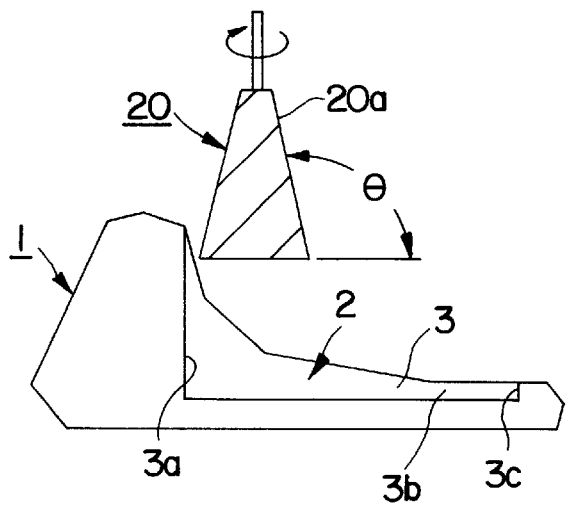
FIG. 9 illustrates another prior art cutting tool and head ingot.
Figure 10:
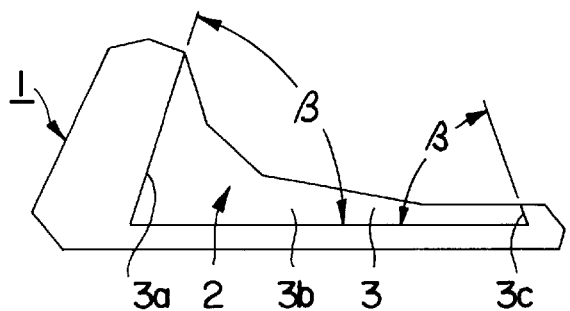
FIG. 10 shows the head ingot upon which cutting by the prior art cutting tool of FIG. 8 has been performed.
Figure 11:
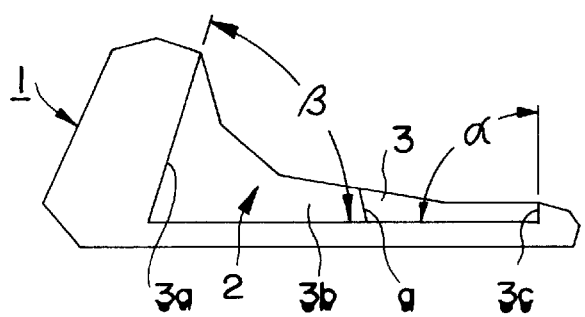
FIG. 11 illustrates the head ingot on which cutting by the prior art cutting tools of FIGS. 7 and 9 has been performed.

As a result, the head ingot 1 as shown in FIG. 6 is obtained in which the boundary between the overhanging surface with a cutting angle of β that corresponds to the cutting surface angle θ1 of the conical cutting section 31 of the cutting tool 30 and the upright surface with a cutting angle of α that corresponds to the cutting surface angle θ2 of the cylindrical cutting section 32 of the tool 30 is continuously formed without a step in between.

After the cutting as described above is finished, polishing of the entire surface of the head ingot 1 is executed followed by a surface treatment such as plating, etc.; and the finished head 100 shown in FIGS. 1 and 2 is thus obtained.

As seen from the above, according to the present invention, a rotary cutting tool which has a conical cutting section and a cylindrical cutting section is used for manufacturing an iron golf club head. These two cutting sections are formed into an integral unit of two stages with different cutting surface angles from each other; and in use, the inner circumferential surface on the sole side of an indentation, which is to be a cavity and formed on the back side of a head ingot which has been roughly finished, is cut into an overhanging surface shape by the conical cutting section and cylindrical cutting section of the cutting tool; and then, continuously, the toe and heel side inner circumferential surfaces and top side circumferential surface of the head ingot are cut into upright surface shapes by the cylindrical cutting section of the cutting tool. Thus, the overhanging and upright surfaces on the inner circumference of the cavity can be continuously formed with good efficiency and without forming any step by means of a single rotary cutting tool.

We claim:

1. A method for manufacturing by a cutting tool an iron golf club head having a cavity that is formed as an indentation on a back surface side of said head, and an inner circumferential surface on a head sole side of said cavity is formed with a shape of an overhanging surface and other inner circumferential surfaces which are continuous to said overhanging surface and comprise toe, heel and top sides of said cavity are formed with a shape of upright surfaces, wherein, said rotary cutting tool has a configuration in which a conical cutting section and a cylindrical cutting section are integrated into two stages;

said inner circumferential surface on said sole side of said indentation on the back surface side of a roughly finished and formed head ingot is cut into overhanging surface shape by means of said conical cutting section and said cylindrical cutting section;

said other inner circumferential surfaces of said indentation on said to toe, heel top sides, which are continuous to said overhanging inner circumferential surface, are cut into upright surface shapes by means of said cylindrical cutting section; and a surface of said head ingot which has been subjected to said cutting is subjected to surface treatments including polishing and plating.

2. A method for forming a golf club head from an iron ingot having a cavity by a method comprising the steps of:

cutting a first inner circumferential surface of an indentation in said iron ingot so as to form a first inner circumferential surface into an overhanging surface shape by a conical cutting section of a rotar, cutting tool and a cylindrical cutting section of said cutting tool, said first inner circumferential surface being located on a sole side of said club head;

cutting second inner circumferential surfaces and a third inner circumferential surface of said indentation so as to form said second and third inner circumferential surfaces into upright surface shapes by said cylindrical cutting section of said cutting tool, said second inner circumferential surfaces being located on toe and heel sides of said club head and said third inner circumferential surface being located on a top side of said club head; and an entire surface of said club head upon which cutting by said cutting tool has been performed is surface treated.

* * * * *